2,814,558
Patented Nov. 26, 1957

2,814,558

METHOD OF REDUCING IRON ORES CONTAINING TITANIUM

Roy A. Halversen, Dearborn, Mich.

No Drawing. Application June 25, 1953, Serial No. 364,210

1 Claim. (Cl. 75—41)

This invention relates to the smelting of ores, more particularly to the reduction of titaniferous iron ores to produce metallic iron of high quality. This application is a continuation-in-part of application Serial No. 355,190, filed May 14, 1953.

The recovery of iron from its naturally occuring ores is almost universally carried out by reduction of the oxide to the metal. Many iron ores occur naturally in the form of iron oxides. Most of the others, such as the carbonates and sulfides, which are utilized commercially are generally roasted in free contact with the air which drives off carbon dioxide and sulfur, respectively, and converts the iron to its oxide. The suitability of naturally occuring iron oxides, and of those obtainable by roasting the naturally occurring non-oxide ores, vary considerably in their value for the production of iron because of the differences in the ease with which they can be reduced to the metal depending, principally, upon the nature and proportion of other substances present. Such reductions are almost always accomplished in a blast furnace or, to some extent, in an open hearth furnace, wherein the actual reducing agent is principally carbon monoxide obtained by the combustion of carbon, generally in the form of metallurgical coke. The carbon, together with limestone as a fluxing agent, is generally mixed with the ore prior to or during its introduction into the furnace.

In the conventional operation of a blast furnace, and in other operations involving the production and purification of iron, provision must be made for separating impurities occurring in the ore from the liquid metallic iron produced. Such impurities may consist of clay and other earthy substances generally in the nature of complex silicates, aluminates and the like and may also include considerable proportions of compounds of other heavy metals. Sulfur-, silicon- and phosphorus-containing compounds are generally present in the ore, or may be introduced along with carbon in the form of coke, and especial care must be exercised to rid the iron of these harmful substances when the iron is to be used for many purposes. The separation of certain of such substances from the molten iron is usually effected by including with the ore and carbon charged into the furnaces a considerable proportion of limestone. During the course of the operation, the limestone is decomposed to form carbon dioxide and lime and the latter combines with the various silicates, aluminates and certain of the other non-ferrous ingredients of the charge to form a molten slag which drips downward in the furnace along with the molten iron and eventually settles in the bottom of the furnace as a molten layer floating on the molten iron. The liquid slag and the liquid iron are periodically drawn off separately from the lower part of the furnace. The liquid iron is cast into pigs or utilized in any desirable manner, as in the making of steel, and the slag is disposed of in any convenient way. Carbon dioxide evolved from the limestone is converted upon contact with the hot carbon to carbon monoxide and this, together with that formed by combustion of the carbon, serves as the effecting reducing agent to reduce the ore to metal.

Iron produced in a blast furnace is relatively impure and must be further refined for many uses, particularly for making steel. The unsuitableness for many purposes of steels containing excessive quantities of phosphorus, sulfur or silicon is well known as are also the conventional methods employed for removing these impurities utilizing the Bessemer converter, the open hearth furnace and the electric furnace. Phosphorus, silicon and sulfur are generally present in pig iron in proportions greater than can be tolerated for many subsequent uses of the iron.

In most instances the presence of a compound of a heavy metal other than iron in an ore which is to be smelted does not give rise to too great difficulties. During the smelting operation the other metal will either be reduced to its elemental state and be recovered as an ingredient of the molten iron or it will appear as a compound in the slag. In the event, however, that the ore contains more than a very small proportion of titanium, it is found that the melting point of the slag is so high that it can be drawn from the furnace as a liquid only with great difficulty or not at all. This may be due to the presence of calcium titanates, titanium carbides, titanium cyanides or other titanium compounds as very high-melting components of the slag. Unfortunately, many deposits of otherwise excellent iron ores, especially oxide ores, are contaminated with sufficient titanium to cause them to be practically unworkable in the conventional operation of a blast or open hearth furnace, or in any process which depends upon the formation of a liquid slag. Ilmenite, for example, occurs in large quantities in readily accessible locations but contains such a large proportion of titanium that it is impossible to reduce the iron to metal in a blast furnace on account of the difficulties mentioned. It is generally considered that iron ores containing more than about one percent of titanium are unworkable in a blast furnace.

The same difficulties, especially with respect to titaniferous ores, are encountered in the operation of the open hearth furnace following conventional procedures. The open hearth furnace, although used primarily for the refining of pig iron, is a significant producer of iron direct from its ores because a certain amount of limestone and iron ore is generally charged into the furnace along with the molten pig. The presence of more than a small proportion of titanium in the ore results in the formation of a high-melting slag from which it is difficult to separate the iron or steel. Although the open hearth furnace can be operated so as to reduce the proportion of silicon, phosphorus and sulfur, especially the proportion of phosphorus, in the final product, as compared with the proportion of these substances generally present in pig iron, the time required is excessive, often amounting to from six to ten hours per charge.

It is apparent that a method or process whereby iron ores containing a high proportion of titanium could be reduced to metal in a blast or open hearth furnace would be of great value. The value of such a method would be further enhanced if, at the same time, the proportion of silicon, sulfur and phosphorus in the pig iron produced were materially less than those normally present in pig iron produced by conventional procedures.

In the parent application referred to there is described and claimed a process for the reduction of iron ores containing titanium and other constituents, which form calcium based slags of inconveniently high melting point, wherein a portion or all of the limestone generally used as fluxing agent in the reduction of iron ores is replaced with an alkali metal halide and a slag of lower melting point thus obtained, the alkali metal halide being subjected in the furnace to the elevated temperature and vigorous oxidative conditions within the furnace, such as those which prevail in the hot oxidizing zone of a blast furnace immediately above the layer of molten slag. It is also disclosed in the parent application that, at least under certain conditions, the alkali metal halide can be replaced with sodium carbonate and a slag of adequate fluidity obtained using a feed ore containing a higher proportion of titanium than is generally considered suitable for reduction using conventional blast furnace or open hearth furnace procedures with limestone as the fluxing agent. Thus, it was shown that a mixed ore containing about 40 percent iron calculated as Fe, about 5 percent titanium calculated as $TiO_2$ and about 6.6 percent phosphorus calculated as elemental phosphorus could be reduced readily with the formation of a highly fluid slag using a mixture of sodium carbonate and lime as the fluxing agent.

It has now been found that the use of the alkali metal carbonates and bicarbonates can be extended to the reduction of a wide variety of titaniferous iron oxide ores containing not only phosphorus but sizable proportions of sulfur and silicon as well and that the process can be carried out so that certain ores can be reduced readily in conventional blast and open hearth furnaces to give a high grade of pig iron and to form a slag which is readily flowable at the ordinary operating temperature employed when using such furnaces. Using the process, iron can, in many instances, be produced directly in a blast furnace or in an open hearth furnace having contents of sulfur, phosphorus, titanium and silicon sufficiently low to enable it to be used directly for making high grade castings. If desired, iron from the blast furnace using the process can be converted directly to steel, e. g. in the open hearth or in a Bessemer or in an electric furnace. When so employed, the process described can be extended to these operations by the use of additional quantities of an alkali metal carbonate or bicarbonate in the steel making operation and this operation facilitated greatly. By proper operation of the process, the proportion of sulfur, silicon and phosphorus in the finished steel can be reduced to substantially any desirable degree.

It is to be noted that the alkali metal carbonate or bicarbonate need not necessarily be subjected to oxidative conditions in the furnace although it is often convenient to introduce it into the furnace in such a way that it does encounter such conditions. Although the process can be operated using any alkali metal carbonate or bicarbonate, such as sodium, potassium or lithium carbonate or bicarbonate, the preferred fluxing agent is sodium carbonate because of its ready availability and low cost and the invention will, for convenience, be described with particular respect thereto. Sodium carbonate is also preferred over potassium carbonate because of its greater ease of dissociation into carbon dioxide and sodium oxide although this is not an all-important factor at the temperature involved.

It is thought that the effectiveness of sodium carbonate in producing a low melting slag depends upon the decomposition of the compound in the hot zone of the furnace to form carbon dioxide and an oxide of sodium or some other sodium-containing thermal decomposition product of the carbonate or bicarbonate, the nature of which has not been fully determined. It is even possible that, because of the presence of moisture in the ore or in the air-blast, a certain amount of the sodium is converted to sodium hydroxide and that this is an effective fluxing agent. In any event, it appears that the substitution of sodium carbonate for a part or all of the limestone normally employed in such processes results in the formation of a slag based partly or in whole upon sodium rather than upon calcium, and that such sodium based slags are sufficiently lower melting than are the calcium based slags so that the furnace can be operated in normal manner insofar as temperature is concerned and a readily flowable slag obtained rather than a difficultly flowable or actually substantially infusible slag as is the case when limestone is used as the only fluxing agent.

It also appears that the higher alkalinity imparted to the charge in the furnace by the substitution of sodium carbonate for at least a part of the limestone is a contributing factor to the conversion of the sulfur, phosphorus and silicon in the charge to compounds which appear in the slag rather than in the iron. Furthermore, it appears that the substitution of a part of the limestone with sodium carbonate leads to the formation of eutectic mixtures in the slag which are in themselves of lower melting point than either the calcium or sodium based slags alone. It is apparent that in a complex mixture, such as those involved in the slag formation in a blast furnace, the actual nature and proportions of the individual compounds formed at the high temperatures involved is exceedingly difficult to determine. The invention is not limited, however, as to the precise mechanism of the action of the carbonate or bicarbonate in producing a more fluid slag than is produced when the fluxing agent is the conventional limestone.

In the light of the above, it is apparent that it is not always necessary to use sodium carbonate as the only fluxing agent but that sodium carbonate can be used in conjunction with limestone in many instances. In general, it is found that the higher the content of sulfur, phosphorus, silicon and titanium in the ore being reduced, the greater the proportion of sodium carbonate that can be used advantageously. This is particularly true when using ores high in titanium content, such as ilmenite which often contains as much as 38 percent of titanium calculated as titanium dioxide. In such instances it may sometimes be advisable to replace all or a very large proportion of the limestone with sodium carbonate. The same is true when using ores high in silica. In general, sodium carbonate is used in a proportion approximately equivalent chemically to limestone omitted from an otherwise normal charging mixture, but the invention is not limited in this respect. In the case of certain ores especially those low in titanium content, advantageous results are obtained by using only enough sodium carbonate to constitute about 5 to 25 percent of the fluxing agent. It is generally desirable to use only enough sodium carbonate to produce a slag which will flow readily at a temperature of about 2300 degrees F.

It is convenient and preferred to introduce the sodium carbonate into a blast furnace at a point near the surface of the layer of molten slag to insure its being subjected to substantially the highest temperature prevailing in the furnace. It is probable that when this procedure is followed the sodium carbonate is decomposed almost instantly to carbon dioxide and to a sodium oxide or to some other sodium-containing thermal decomposition product of the sodium carbonate which contributes to slag formation. The sodium-containing thermal decomposition product is undoubtedly volatile at the temperature prevailing in the hot zone of the furnace and the vapors are thus swept upward through the charge in the hot gas stream so that they are in the best possible form to contact all parts of the charge and to react readily with the slag-forming components of the ore. This is in contrast to the fluxing action of lime resulting from the decomposition of limestone. Calcium oxide has an extremely low vapor pressure at the temperatures involved and can thus exert its fluxing action only when the solid substances come into actual contact with one another. This explains the fact that the utilization of sodium carbonate as a fluxing agent leads to a very greatly increased rate of reduction of ore in a furnace of given dimensions which in turn increases greatly the capacity of the furnace for iron production. The high volatility of the sodium-containing thermal decomposition product of sodium carbonate is also advantageous in that it promotes fluxing of the titanium contained in the ore at some distance above the actual oxidizing zone of the furnace. In this way, the titanium appears to be converted directly from the compounds in which it is present in the ore to a slag-forming constituent without the possibility of its being first converted to titanium dioxide or to titanium nitride. Both of the latter compounds, especially the nitride, are difficult to decompose and convert into slag-forming constituents once they have actually been formed in the furnace. For this reason it is advantageous that they be converted directly to slag at as low a temperature as possible.

Although it is preferred that the sodium carbonate be introduced into the hottest zone of the furnace, conveniently in powdered form fed into the furnace with the air stream through the tuyères or through an auxiliary port, it is entirely possible to mix the sodium carbonate with the ore and coke, and with such limestone as may be used, and to feed the entire charge into the top of a blast furnace, or directly onto the hearth of an open hearth furnace, in conventional manner. Under such conditions the thermal decomposition of the sodium carbonate takes place as soon as it reaches a zone in the furnace where the temperature is sufficiently high to cause the decomposition to take place. This is generally above the zone of oxidation. In some instances it may even be advisable to introduce a portion of the sodium carbonate used into the top of the blast furnace and the balance into the hot zone with the air stream. Either procedure, or a combination of both, can be used without departing from the spirit of the invention.

It should be noted also that when the sodium carbonate is decomposed thermally a considerable proportion of it is converted to carbon dioxide. This is reduced to carbon monoxide upon contact with hot coke in the furnace and is thus available for reducing the ore. Because of this fact the amount of coke used can be reduced by a corresponding amount and this adds to the capacity of the furnace insofar as the production of iron is concerned. This is particularly true when the sodium carbonate is introduced with the air into the hot zone because the carbon dioxide formed has a much greater opportunity to be reduced to carbon monoxide before it leaves the furnace.

It should be pointed out further that, although the alkali metal bicarbonates can be used in the process, the normal carbonates are preferred because, when they are decomposed thermally, they do not give rise to the formation of water along with carbon dioxide. The disadvantages of introducing excessive amounts of moisture into a blast or open hearth furnace are known.

Certain advantages are apparent from the following example which is given by way of illustration only and is not to be construed as limiting.

*Example*

A cupola furnace was operated continuously on an experimental basis for the reduction of iron ore. Ore, limestone and coke were fed into the top of the furnace in mixed charges each consisting of 24 lb. coke, 2 lb. limestone, 18 lb. scrap iron and 18 lb. ore. A blast of air was maintained upward through the furnace. Slag and molten iron were tapped periodically from the bottom of the furnace, the iron being cast into ingots. During most of the operating period common salt was fed into the furnace with the air blast through the tuyères, in accordance with method of the parent application, to compensate for the deficiency of limestone over that which would otherwise have been necessary and to promote the formation of a fluid slag when ores high in titanium were used.

During the operation of the furnace two successive charges A and B were fed into the furnace, the ore of which had the following composition:

*Charge A.*—A frangible mixed ore equivalent to ⅓ apatite and ⅔ magnetite having a composition of 40 percent Fe, 5 percent $TiO_2$ and 6.6 percent P.

*Charge B.*—Hematite consisting essentially of hydrated iron oxide.

During the time the charges A and B were in the reducing zone of the furnace the addition of salt was discontinued and 5 lb. of soda ash was fed gradually into the furnace with the air stream at the bottom of the furnace. The slag formed during this period has a melting point sufficiently low to cause it to flow readily and freely from a one-inch tap hole. The cold slag was hard, shiny black solid which, when ground and mixed with water, gave an alkaline solution. The slag temperture at the draw-off was about 2370 degrees F., the metal temperature at the draw-off was about 2370 degrees F. and the furnace temperature at the level of the tuyères was about 2660 degrees F.

An ingot was poured which consisted principally of the iron from the ore in charges A and B. A sample from the ingot had the following composition:

| | Percent |
|---|---|
| Silicon | 0.10 |
| Manganese | 0.02 |
| Graphitic carbon | 0.08 |
| Total carbon | 2.91 |
| Phosphorus | 0.74 |
| Sulfur | 0.14 |
| Titanium | 0.11 |

It is apparent from the example that the process can be operated using ores much higher in titanium and phosphorus than any which are usable in the conventional operation of a blast furnace with the production of a slag which is free-flowing at a relatively low temperature and an iron exceptionally low in silicon, phosphorus, sulfur, manganese and titanium recovered. Such an iron is superior to conventional pig iron for many purposes without further refining. It is significant to note that these results were obtained in a small cupola wherein the flow of molten iron was not more than six feet. This illustrates the ready and rapid removal by the vaporous sodium oxide of these substances, as well as of alumina and other "blocking agents" which tend to collect during the process on the surface of the ore and on the liquid iron. This is in contrast to the slower action of lime where slagging of these substances can occur only when they actually come into physical contact with the lime.

I claim:

In the method for smelting an iron ore containing at least about 5 parts by weight of titanium, calculated as $TiO_2$, and at least about 6.6 parts of phosphorous, calculated as elemental phosphorous, for each 40 parts of iron, calculated as elemental iron, in a blast furnace employing a blast of air near the bottom of the furnace, the steps which include: feeding a charge comprising about 24 parts by weight of coke, about 2 parts of limestone and about 18 parts of the said ore into the furnace; maintaining the charge in the hot zone of the furnace at a temperature of at least about 2660° F.; introducing with the blast of air about 5 parts by weight of powdered sodium carbonate for each 18 parts of said ore introduced at the top of the furnace; and withdrawing separately from the furnace a molten slag flowable at about 2370° F. and molten iron containing about 0.74 percent by weight of phosphorous and about 0.11 percent by weight of titanium.

References Cited in the file of this patent

UNITED STATES PATENTS

| 33,949 | Lane | Dec. 17, 1861 |
| 486,941 | Rossi | Nov. 29, 1892 |
| 1,043,371 | Sundberg | Nov. 5, 1912 |
| 1,145,506 | Pasquier | July 6, 1915 |
| 2,159,977 | Nicholas | May 30, 1939 |

(Other references on following page)

UNITED STATES PATENTS

| | | |
|---|---|---|
| 2,205,896 | Yamagata | June 25, 1940 |
| 2,238,673 | Asak | Apr. 15, 1941 |
| 2,366,177 | Campbell | Jan. 2, 1945 |
| 2,417,101 | Campbell | Mar. 11, 1947 |
| 2,440,564 | Allard | Apr. 27, 1948 |
| 2,453,050 | Turbett | Nov. 2, 1948 |

FOREIGN PATENTS

| | | |
|---|---|---|
| 493,731 | Great Britain | Oct. 13, 1938 |

OTHER REFERENCES

Beck et al.: Treatment of Titaniferous magnetite Ore From Iron Mountain, Wyo., Bureau of Mines, R. I. 4902, U. S. Dept. of Interior. August 1952.